(12) United States Patent
Nobile (10) Patent No.: US 9,565,835 B1
(45) Date of Patent: Feb. 14, 2017

(54) LASER AND STRING ANIMAL TOY

(71) Applicant: Bryan P. Nobile, Lowell, MA (US)

(72) Inventor: Bryan P. Nobile, Lowell, MA (US)

( * ) Notice: Subject to any disclaimer, the term of this patent is extended or adjusted under 35 U.S.C. 154(b) by 140 days.

(21) Appl. No.: 14/529,934

(22) Filed: Oct. 31, 2014

Related U.S. Application Data (60) Provisional application No. 61/898,094, filed on Oct. 31, 2013.

(51) Int. Cl.
*A01K 15/00* (2006.01)
*A01K 15/02* (2006.01)
*F21V 33/00* (2006.01)

(52) U.S. Cl.
CPC ........... *A01K 15/025* (2013.01); *F21V 33/008* (2013.01)

(58) Field of Classification Search
CPC ............................... A01K 15/02; A01K 15/025
USPC .......................................... 119/702, 707, 708
See application file for complete search history.

(56) References Cited

U.S. PATENT DOCUMENTS

| | | | |
|---|---|---|---|
| 4,930,448 A | 6/1990 | Robinson | |
| D309,364 S | 7/1990 | Shaw et al. | |
| 4,940,018 A | 7/1990 | Edling | |
| 5,575,241 A | 11/1996 | Line | |
| 5,823,844 A * | 10/1998 | Markowitz | ............ A63H 11/02 119/707 |
| 5,924,387 A | 7/1999 | Schramer | |
| 5,941,196 A * | 8/1999 | Domanski | ............ A01K 15/025 119/708 |
| 6,058,887 A * | 5/2000 | Silverman | ............ A01K 15/025 119/609 |
| 6,345,593 B1 * | 2/2002 | Stewart | ................ A01K 15/025 119/706 |
| 6,481,381 B2 | 11/2002 | Ritchey | |
| 6,629,510 B1 | 10/2003 | Robkin | |
| 6,651,591 B1 * | 11/2003 | Chelen | ................. A01K 15/027 119/707 |
| 6,701,872 B1 * | 3/2004 | Allen | .................... A01K 15/025 119/707 |
| 6,883,465 B2 | 4/2005 | Telford et al. | |
| 6,892,675 B1 * | 5/2005 | Comerford | .......... A01K 15/025 119/706 |
| 7,823,541 B2 | 11/2010 | Comerford | |
| 8,347,823 B1 * | 1/2013 | Thomas | ............... A01K 15/025 119/707 |
| 8,640,653 B2 * | 2/2014 | Cook | .................... A01K 15/025 119/707 |
| 2002/0002955 A1* | 1/2002 | Lorenz | ................. A01K 15/025 119/707 |
| 2012/0097114 A1* | 4/2012 | Scott | .................... A01K 15/025 119/707 |

(Continued)

*Primary Examiner* — Danielle Clerkley
(74) *Attorney, Agent, or Firm* — Robert L. Montgomery; Montgomery Patent and Design, LLC (57) ABSTRACT

A laser and string animal toy having a base assembly and an arm assembly comprising a stand post that extends upward from the base assembly and a horizontally protruding flexible member attached to the stand post. A housing is attached to the flexible member. A first actuator assembly is located within the housing and a string attached to the first actuator assembly first actuator assembly moves (via a motor) the string moves around and up and down. The housing also retains a second actuator assembly that produces a downward directed laser dot. The second actuator assembly moves the laser dot across the floor.

17 Claims, 6 Drawing Sheets

(56) References Cited

U.S. PATENT DOCUMENTS

| | | | | |
|---|---|---|---|---|
| 2014/0261230 A1* | 9/2014 | Davison, III | ........ | A01K 15/025 |
| | | | | 119/707 |
| 2014/0267720 A1* | 9/2014 | Miller | .................. | A01K 15/025 |
| | | | | 348/143 |
| 2014/0283757 A1* | 9/2014 | Davison, III | ........ | A01K 15/025 |
| | | | | 119/707 |

* cited by examiner

LASER AND STRING ANIMAL TOY

RELATED APPLICATIONS

This application claims the benefit of U.S. Provisional Application No. 61/898,094, which was filed Oct. 31, 2013, the entire disclosures of which are incorporated herein by reference.

FIELD OF THE INVENTION

The presently disclosed subject matter is directed to animal toys. More particularly, it is directed to toys that entertain animals by projecting a rotating laser beam onto the floor while enticingly moving a string.

BACKGROUND OF THE INVENTION

Cats and other pets not only need their physical requirements of food, water and shelter to be met, but they also have emotional needs such as companionship, love and entertainment that should also be met. The stresses and time demands of modern life often make it difficult for pet owners to fulfill the physical requirements of pets. To help, automated food feeders and full, large water bowls can help tend to the physical needs of pets even when the owner is not present or busy. However, the emotional needs of pets are often difficult for absent or busy pet owners to provide.

Emotional needs are even more critical for young kittens that may find themselves alone for the first time in their lives. In the wild there would be an abundance of stimulation. But in a house with an absent or busy pet owner there is little to stimulate or entertain a kitten. Such lack of stimulus can lead to life-long insecurity which may manifest itself in destructive habits such as scratching. While the foregoing has generally described cats, other pets have similar emotional needs.

Accordingly, there is a need for a toy that can provide cats and other pets with stimulating entertainment not only when the owner is around but when the owner is not present or is otherwise unavailable for play.

SUMMARY OF THE INVENTION

The principles of the present invention provide for a laser and string toy that provides cats and other pets with stimulating entertainment.

A laser and string animal toy in accord with the present invention includes a base assembly and an arm assembly comprising a stand post that extends upward from the base assembly and a horizontally protruding flexible member attached to the stand post. The laser and string animal toy also includes a housing that is attached to the flexible member; a first actuator assembly within the housing, a string attached to the first actuator assembly, and a second actuator assembly within the housing producing a downwardly directed laser dot. The first actuator assembly moves the string around and up and down and the second actuator assembly moves the laser dot across a floor.

The base assembly beneficially includes a conical shaped base having a weighted bottom plate that is sufficiently heavy to retain the arm assembly upright. The base assembly may also include an enclosing control compartment retaining a battery for providing electrical power and an electronic control module for controllably supplying electrical power to the first actuator assembly and to the second actuator assembly. The base assembly may retain a user accessible power switch for switching electrical power from the battery to the control module, a first speed dial connected to the control module for controlling the operating speed of the string, and a second speed dial connected to the control module for controlling the speed of motion of the laser dot. Interconnecting wiring that passes from the control module, through the stand post, through the flexible member to the first actuator and to the second actuator may be included. Preferably, the base assembly also includes a door for providing access to the battery. In operation the control module may operate in accord with embedded software.

The first actuator assembly might include a variable-speed first electric motor and a gear train. Beneficially, that gear train would be an epicyclical gear train having a sun gear and a planet gear. In practice the string is attached to the planet gear, which may include an aperture through which the string passes. The string may be tied to planet gear by a knot.

The second actuator assembly may include a variable-speed second electric motor which moves a mirror. The second actuator assembly preferably further includes a laser device that emits a laser beam onto the mirror which directs the laser beam downward. In practice the laser device may be a laser diode. The laser beam passes through a window. The mirror may rotate on an axle, it may move the laser beam in a circular path, or it may move the laser beam in an ovular path.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

DESCRIPTIVE KEY 10 laser and string animal toy
11 pet
12 floor
20 stand
30 string
31 knot
35 first actuator assembly
36a sun gear
36b planet gear
37 first motor
38 aperture
39 second motor
40 laser
42 laser window 44 mirror
46 axle
50 base assembly
52 weighted plate
55 stand post
57 flexible member
58a first connector
58b second connector
60 housing
61 laser beam
62 effective laser area
63 second actuator assembly
64 laser dot
65 wiring
67 laser source
80 control compartment
82 battery
83 battery support mount/connector
85 control module
110 power switch
115a first speed dial
115b second speed dial
150 door
152 latch
154 hinge

DETAILED DESCRIPTION OF THE PREFERRED EMBODIMENT

The preferred embodiment of the present invention is depicted within FIGS. 1 through 6. However, the invention is not limited to what is specifically illustrated and described. A person skilled in the art will appreciate that many other embodiments of the invention are possible without deviating from the basic concept of the invention. Any such work around also falls with the scope of this invention.

The terms "a" and "an" herein do not denote a limitation of quantity, but rather denote the presence of at least one (1) of the referenced items. In addition, unless otherwise denoted all directional signals such as up, down, left, right, inside, outside are taken relative to the illustration shown in FIG. 1.

The present invention describes a laser and string animal toy 10 which provides stimulation and entertainment for a pet 11 such as a cat by provoking active chasing and play via cyclic and iterative motions of a string 30 and a laser beam 61.

Figure 1:
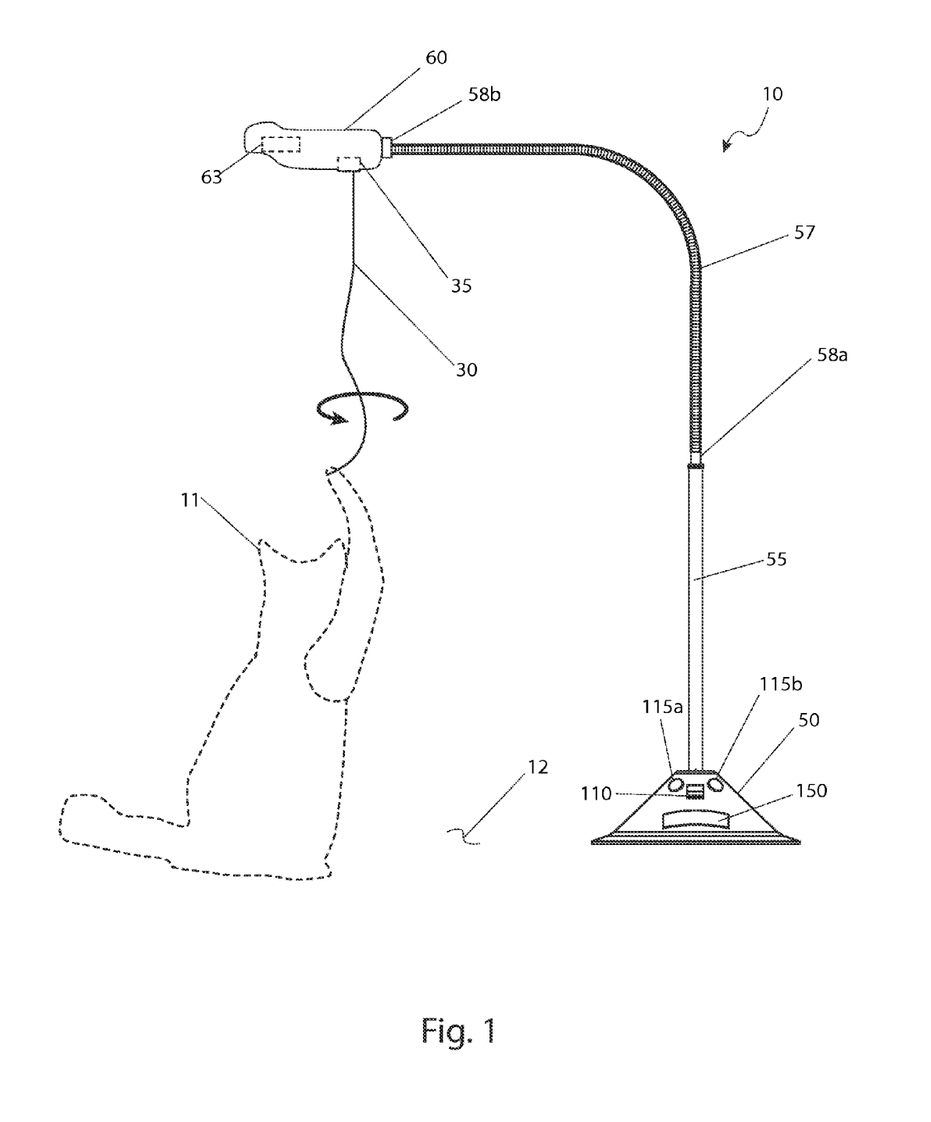
FIG. 1 is a side environmental view of a laser and string animal toy 10 in accord with the preferred embodiment of the present invention and depicting a pet 11 and a string 30.
Figure 2:
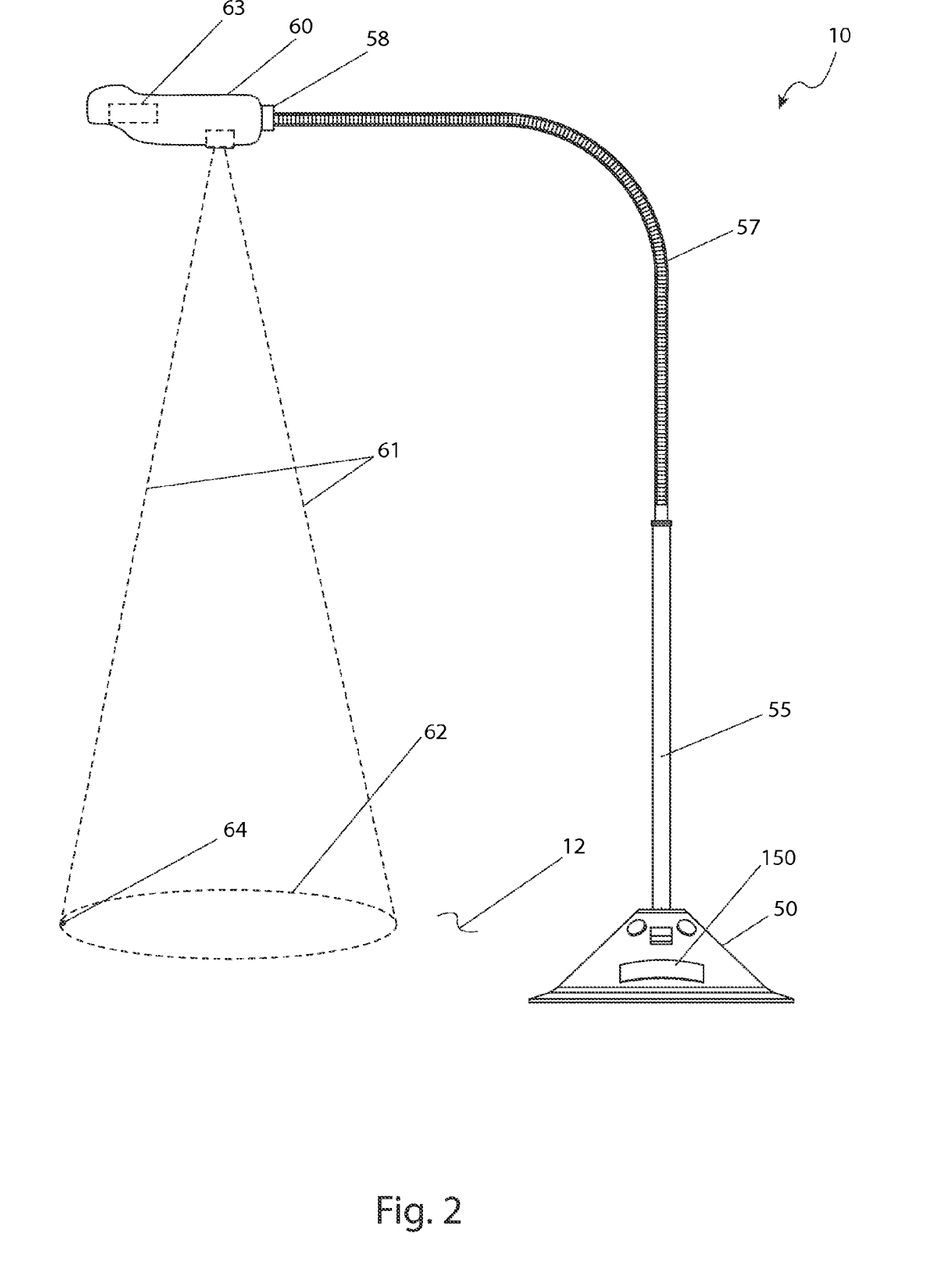
FIG. 2 is another side environmental view of the laser and string animal toy 10 shown in FIG. 1 and illustrating the articulating motion of a laser beam 61.
Figure 3:
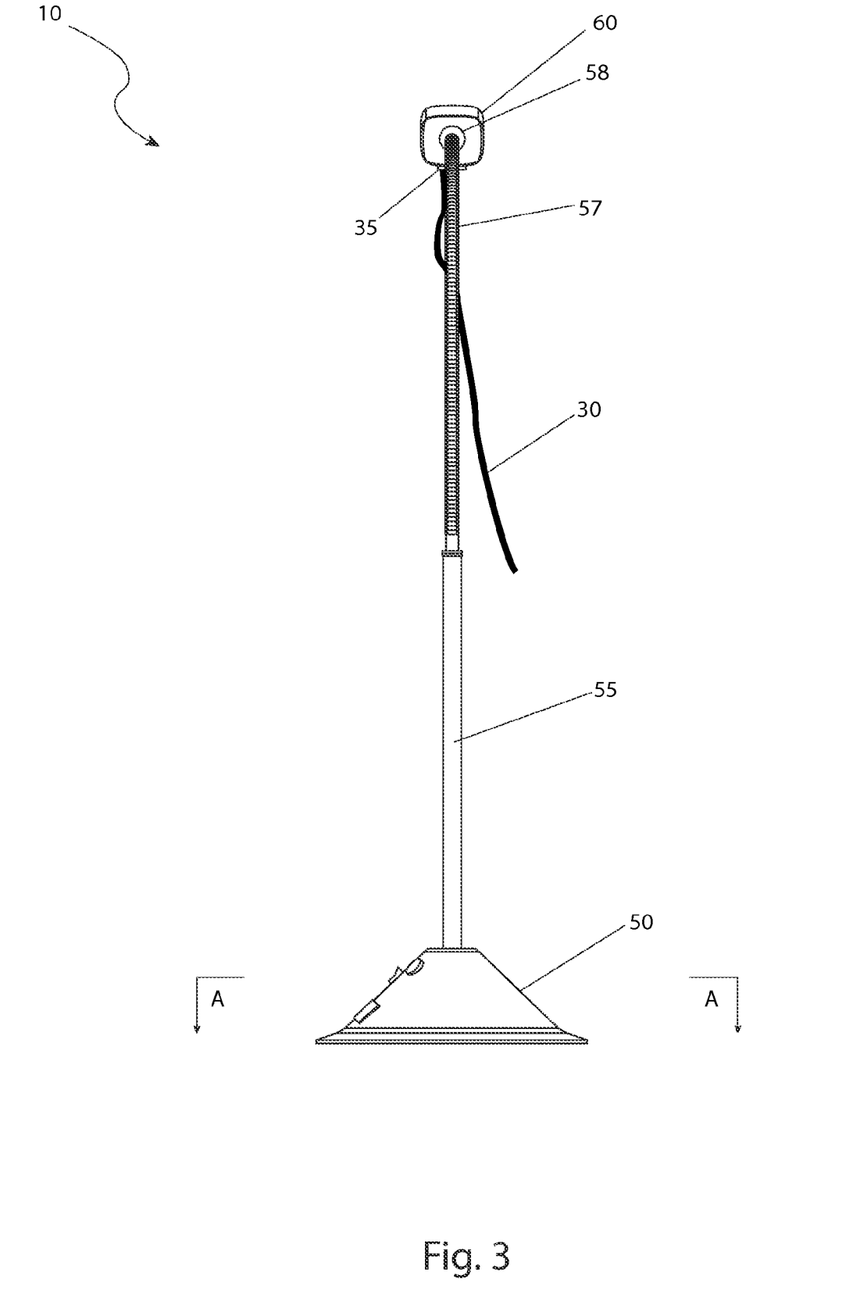
FIG. 3 is a rear view of the laser and string animal toy 10 shown in FIGS. 1 and 2.

Refer now to FIGS. 1, 2, and 3 for environmental views of the laser and string animal toy 10 and which particularly illustrate an articulating string 30 and laser beam 61. The laser and string animal toy 10 has a stand that includes a base assembly 50 and an arm assembly having a stand post 55 and a flexible member 57 which collectively support a housing 60. The housing 60 holds the suspended string 30 and downwardly projects the laser beam 61. The string 30 is suspended from a first actuator assembly 35 that is located within the housing 60 (please reference FIG. 4). The first actuator assembly 35 moves the string 30 which beneficially ends around five to six inches (5-6 in.) above the floor 12 (see FIG. 2) when not moving. The housing 60 also retains a second actuator assembly 63 which, as is explained in more detail subsequently, produces a laser dot 64 on the floor 12.

In use a first motor 37 in the first actuator assembly 35 moves the string 31 around in a circular manner while at the same time jerking it up and down. While this action is happening a second motor 39 in the second actuator assembly 63 moves the laser dot 64 across the floor 12 to gain the attention of the pet 11. The laser dot 64 moves in a controlled fashion about four or five feet (4 or 5 ft.). The laser dot 64 then is turned off. As the pet 11 plays with the string the laser dot 64 turns back on and repeat its motion. As is explained in more detail subsequent the operation of the laser and string animal toy 10 is powered by an internal batter and controlled by control electronics.

Still referring primarily to FIGS. 1, 2, and 3, the base assembly 50 supports the laser and string animal toy 10 in an up-right position using a wide conical shaped base (see, FIG. 5) having a weighted bottom plate 52. The base assembly 50 also houses the electrical power and control equipment which enable operation of the first and second actuator assemblies 35, 63 and which are described in more detail subsequently (see FIG. 6).

The base assembly 50 and vertical stand post 55 are preferably fabricated from a rigid material such as steel, aluminum or plastic while the bottom plate 52 is comprised of any heavy material such as steel. The base assembly 50 rests on the floor 12 and the stand post 55 extends upward from the base assembly 50 approximately two feet (2 ft.). The weight of the bottom plate 52 is at least sufficient to keep the arm assembly (stand post 55 and flexible member 57) upright. The top end of the stand post 55 is permanently fixed to the flexible member 57 via a first connector 58a (FIG. 1).

Still referring to FIGS. 1-3, the flexible member 57 is a gooseneck member that bends to extend horizontally approximately two feet (2 ft.). The housing 60 is attached to the flexible member 57 via a second connector 58a (FIG. 3). The flexible member 57 is envisioned to be made of a compliant and easily bent material such as a wire-wound spring, a soft plastic tube, or the like. The flexible member 57 is thus designed to deflect when the pet 11 pulls on the string 30 and then be restored to its original shape.

Figure 4:
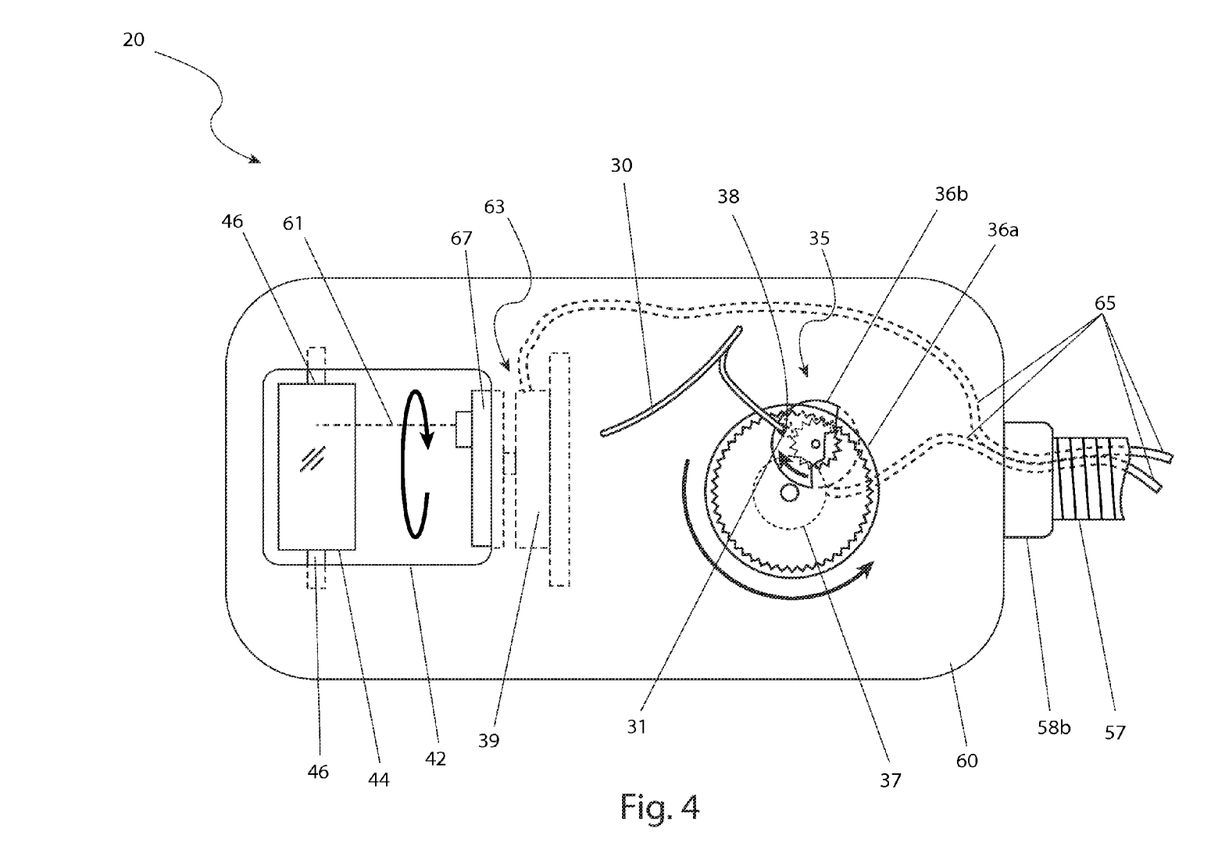
FIG. 4 is a bottom view of a housing 60 of the laser and string animal toy 10 shown in FIGS. 1-3.

FIG. 4 presents a bottom view of the housing 60. As previously noted the housing 60 encloses the first actuator assembly 35 and the second actuator assembly 63. The first actuator 35 includes a variable-speed first electric motor 37 which moves the string 30 using an epicyclic gear train which includes a sun gear 36a and a planet gear 36b. The epicyclic gear train is to be assembled so the planet gear 36b rolls on the inside of the pitch circle of the sun gear 36a, thereby causing the planet gear 36b to travel in a clockwise direction while rotating relative to the sun gear 36a in an anti-clockwise direction. The attached string 30 consequently exhibits a compound motion comprised of both rotating and vertical components to entice and entertain the pet 11.

It should be understood that moving the string 30 may be created using other mechanical devices if desired, such as various arrangements of planetary gears, differently shaped sun gears, a circular disk, as well as an electrical means utilizing at least one (1) motorized device. However, the sun gear 36a and the planet gear 36b provide a beneficial compound motion that pets 11 find interesting.

The rotating planet gear 36b includes an aperture 38 through which an end of the string 30 is inserted and secured by a knot 31 tied in the string 30. The string 30 is removably affixed to the bottom perimeter of the rotating planet gear 36b using the knot 31 to allow for easy replacement of the string 30 as needed.

The second actuator assembly 63 includes a variable-speed second motor 39 which holds a laser source 67 which emits a laser beam 61. The laser beam 61 is reflected downward through a laser window 42 via an adjustable mirror 44 which is mounted to the housing 60. Adjustment of the mirror 44 on its integral axle 46 varies the reflected angle of the laser beam 61. This results in a sweep of the laser dot 64 across the floor 12. In this case the second motor 39 travels in an oscillating bi-directional manner as controlled by motor controlling electronics (see FIGS. 5 and 6 and discussed subsequently). The mirror 44 may also be capable of moving to create a variable circular or ovular pattern across the floor 12 to entertain the pet 11. The produces an effective laser area 62. The laser source 67 is preferably a laser diode that emits a collimated, coherent beam in the visible wavelength spectrum.

Figure 5:
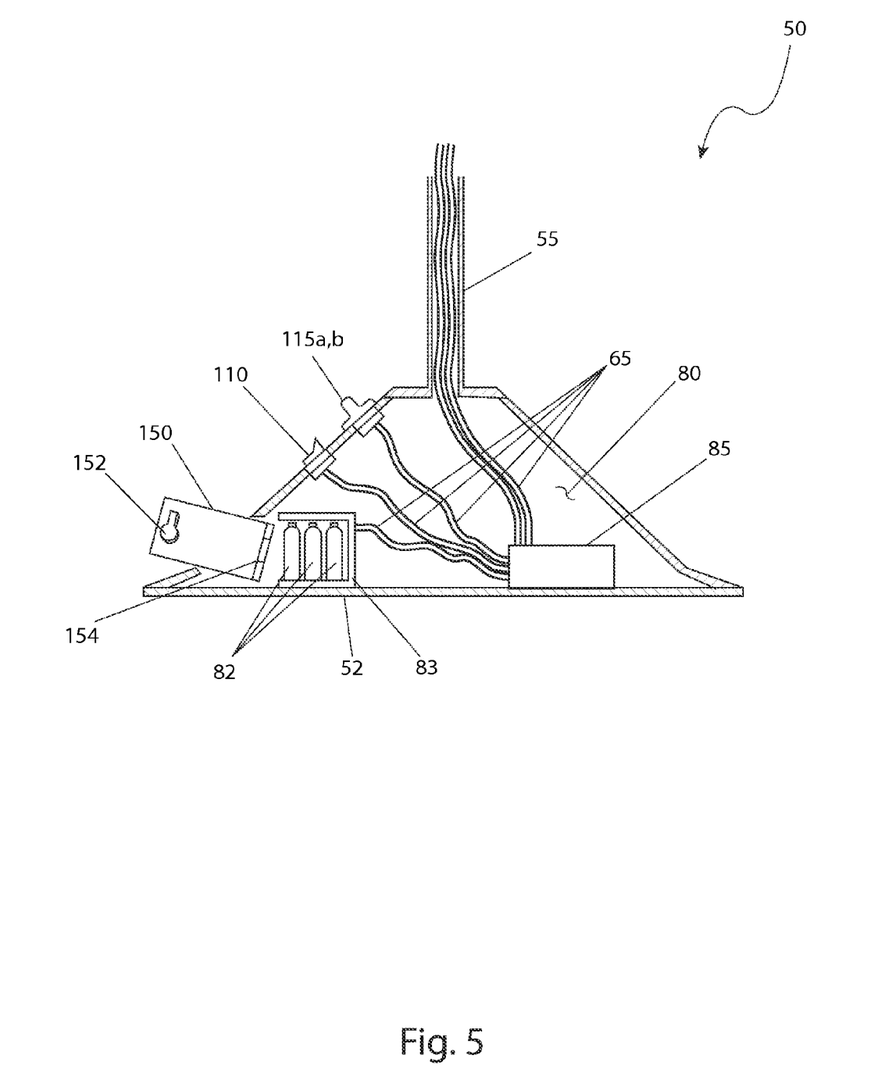
FIG. 5 is a sectional drawing of a base assembly 50 of the laser and string animal toy 10 taken along section line A-A of FIG. 3; and, FIG. 6 is an electrical block diagram of the laser and string animal toy 10 shown in FIGS. 1-3.

Refer now to FIG. 5 for a sectional view of the base assembly 50 taken along section line A-A of FIG. 3. As noted the base assembly 50 provides a stabilizing foundation for the remainder of the laser and string animal toy 10 via a conical base having a bottom weighted plate 52 made of metal or an equivalent material that resists tipping. However, as shown in FIG. 5, the base assembly 50 also includes an enclosing control compartment 80 for electrical and electronic equipment needed to operate the laser and string animal toy 10. The control compartment 80 retains a battery or batteries 82 that are supported on a mount 83; a control module 85, a toggle-type power switch 110, a first speed dial 115a, and a second speed dial 115b (shown together in FIG. 5 because of the angle, but see FIG. 6 for separate dials 115a and 115b). The electrical and electronic equipment within the control compartment 80 are in electrical communication with other devices via interconnecting wiring 65 which in turn pass through the stand post 55 and the flexible member 57. The wiring 65 provides electrical power and control to the first motor 37, the second motor 39, and the laser source 67 in the housing 60 (see FIG. 4). The battery or batteries 82 and other equipment are accessible via a flush-mounted door 150 having a latch 152 and a hinge 154.

The control module 85 provides necessary electrical and electronic components including circuit boards, microprocessors, memory chips, relays, embedded software, and the like. The embedded software within the control module 85 provides various instructions to produce various motion effects of the string 30 and the laser beam 61 to entertain the pet 11 such as, but not limited to: bi-directional motion, speed variations, laser blinking and the like.

As noted the base assembly 50 is equipped with a pair of speed dials 115a, 115b that are externally accessible. The speed dials 115a, 115b enable a user to individually control the speed of each motor 37, 39. It is understood that various additional controls to enable the user to control the motion characteristics of the string 30 and the laser beam 61 may be incorporated into the laser and string animal toy 10, such as buttons, knobs, switches, and the like.

Figure 6:
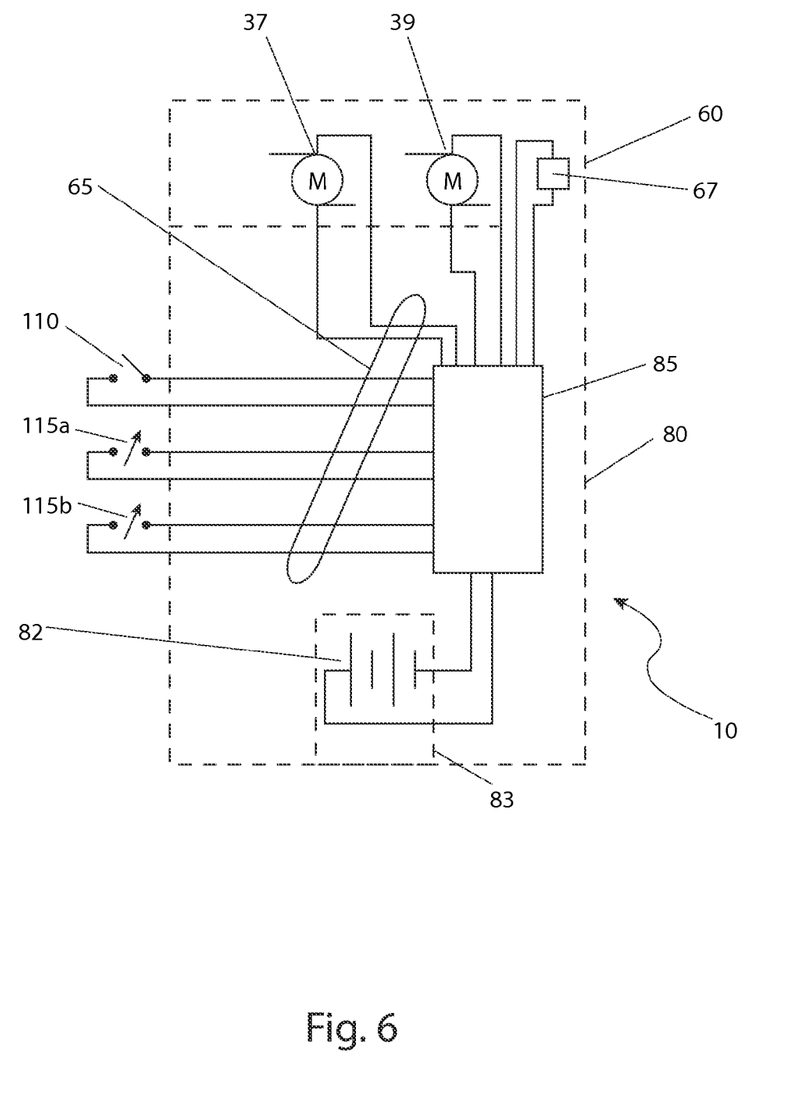

FIG. 6 presents an electrical block diagram of the laser and string animal toy 10. The control module 85 directs electrical power from the battery or batteries 82 to the first motor 37 and to the second motor 39 as well as to the laser source 67 upon closing of the power switch 110. The control module 85 processes control signals from the speed dials 115a, 115b and provides corresponding output current in accordance with software instructions in embedded software within the control module 85 to control the first and second motors 37, 39 via interconnecting wiring 65.

It is envisioned that other styles and configurations of the present invention can be easily incorporated into the teachings of the present invention, and while only one particular configuration is shown and described that is for purposes of clarity and disclosure and not by way of limitation of scope.

The preferred embodiment of the present invention can be utilized by the common user in a simple and effortless manner with little or no training. After initial purchase or acquisition of the laser and string animal toy 10, it would be set in place as indicated in FIG. 1. Using the laser and string animal toy 10 may be performed by: acquiring the laser and string animal toy 10; placing the laser and string animal toy 10 upon a floor 12 in an upright position by allowing the base assembly 50 to support the stand post 55; attaching a string 30 having a desired length to the rotating planet gear 36b of the first actuator 35; placing the power switch 110 "OFF" state; opening the door 150 of the base 50 using the latch 152; installing the required number of batteries 82 within the control compartment 80; closing the door 150; placing the laser and string animal toy 10 in an area for a pet 11 to play; turning the power switch 110 "ON"; allowing the string 30 and laser beam 61 to move to provide stimulation and entertainment for the pet 11; adjusting the rotational speeds of the actuator assemblies 35, 63 as desired using the speed dials 115a, 115b; allowing the pet 11 to be stimulated and entertained for a period of time; turning the power switch 110 "OFF" when it is desired for the pet 11 to stop playing; and benefiting from the stimulation, entertainment and exercise provided the pet 11.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A laser and string animal toy, comprising:
a base assembly;
an arm assembly comprising a stand post that extends upward from the base assembly and a horizontally protruding flexible member attached to said stand post;
a housing attached to the flexible member;
a first actuator assembly within said housing, said first actuator assembly includes a variable-speed first electric motor and an epicyclical gear train having a sun gear and a planet gear;
a string attached to said first actuator assembly; and,
a second actuator assembly within said housing producing a downwardly directed laser dot;
wherein said first actuator assembly moves said string around and up and down; and,
wherein said second actuator assembly moves said laser dot.

2. The laser and string animal toy recited in claim 1, wherein said base assembly includes a conical shaped base having a weighted bottom plate sufficiently heavy to retain the arm assembly upright.

3. The laser and string animal toy recited in claim 1, wherein said base assembly has an enclosing control compartment retaining a battery for providing electrical power and an electronic control module for controllably supplying electrical power to said first actuator assembly and to said second actuator assembly.

4. The laser and string animal toy recited in claim 3, wherein said base assembly retains a user accessible power switch for switching electrical power from said battery to said control module, a user accessible first speed dial connected to said control module for controlling the operating speed of said string, and a user accessible second speed dial connected to said control module for controlling the speed of motion of said laser dot.

5. The laser and string animal toy recited in claim 4, further including interconnecting wiring that passes from said control module, through said stand post, through said flexible member to said first actuator and to said second actuator.

6. The laser and string animal toy recited in claim 3, wherein said base assembly includes a door for providing access to said battery.

7. The laser and string animal toy recited in claim 3, wherein said control module operates in accord with embedded software.

8. The laser and string animal toy recited in claim 1, wherein said string is attached to said planet gear.

9. The laser and string animal toy recited in claim 8, wherein said planet gear includes an aperture and wherein said string passes through said aperture.

10. The laser and string animal toy recited in claim 9, wherein said string is tied to said planet gear by a knot.

11. The laser and string animal toy recited in claim 1, wherein said second actuator assembly includes a variable-speed second electric motor which moves a mirror.

12. The laser and string animal toy recited in claim 11, wherein said second actuator assembly further includes a laser device that emits a laser beam onto said mirror which directs the laser beam downward.

13. The laser and string animal toy recited in claim 12, wherein said laser device is a laser diode.

14. The laser and string animal toy recited in claim 12, wherein said laser beam passes through a window.

15. The laser and string animal toy recited in claim 14, wherein said mirror moves said laser beam in a circular path.

16. The laser and string animal toy recited in claim 14, wherein said mirror moves said laser beam in an ovular path.

17. The laser and string animal toy recited in claim 12, wherein said mirror rotates on an axle.

* * * * *